(12) United States Patent
Johnson

(10) Patent No.: US 10,984,473 B2
(45) Date of Patent: Apr. 20, 2021

(54) TOKEN-BASED ENTITY RISK MANAGEMENT EXCHANGE

(71) Applicant: Capital One Services, LLC, McLean, VA (US)

(72) Inventor: Anthony Johnson, Reston, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/444,777

(22) Filed: Jun. 18, 2019

(65) Prior Publication Data
US 2020/0402168 A1 Dec. 24, 2020

(51) Int. Cl.
*G06Q 40/04* (2012.01)
*G06Q 20/38* (2012.01)
*G06Q 20/36* (2012.01)
*H04L 9/06* (2006.01)

(52) U.S. Cl.
CPC ......... *G06Q 40/04* (2013.01); *G06Q 20/3672* (2013.01); *G06Q 20/38215* (2013.01); *H04L 9/0637* (2013.01)

(58) Field of Classification Search
None
See application file for complete search history.

(56) References Cited

U.S. PATENT DOCUMENTS

2006/0184371 A1* 8/2006 Tsalakopoulos ... G06Q 10/0635 705/7.28
2014/0200953 A1* 7/2014 Mun ...................... G06Q 40/08 705/7.28
2016/0217532 A1 7/2016 Slavin
2016/0342978 A1 11/2016 Davis et al.
2017/0161762 A1 6/2017 Porth et al.
(Continued)

FOREIGN PATENT DOCUMENTS

WO 2017190175 A1 11/2017

OTHER PUBLICATIONS

Leila Bahri and Sarunas Girdzijauskas. 2018. When Trust Saves Energy: A Reference Framework for Proof of Trust (PoT) Blockchains. Proceedings of the The Web Conference 2018 (WWW '18). International World Wide Web Conferences Steering Committee, Republic and Canton of Geneva, Switzerland, 1165-1169. DO (Year: 2018).*

*Primary Examiner* — Mike Anderson
*Assistant Examiner* — Bolko M Hamerski
(74) *Attorney, Agent, or Firm* — Kacvinsky Daisak Bluni PLLC

(57) ABSTRACT

Techniques and apparatus for providing peer-based management of user accounts are described. In one embodiment, for example, an apparatus may include at least one memory and logic coupled to the at least one memory. The logic may be configured to determine a total entity risk value representing a risk position of an entity comprising at least one segment, generate a plurality of risk tokens, each of the plurality of risk tokens having a token value that is a portion of the total risk value, determine a total segment risk value for the at least one segment, the total segment risk value representing a portion of the total entity risk value allocated to the at least one segment, and distribute the plurality of risk tokens to the at least one segment of the entity to correspond with the total segment risk value. Other embodiments are described.

19 Claims, 9 Drawing Sheets

(56) References Cited

U.S. PATENT DOCUMENTS

| | | |
|---|---|---|
| 2018/0089761 A1 | 3/2018 | Stradling et al. |
| 2018/0211318 A1* | 7/2018 | Parikh ................. G06Q 20/382 |
| 2019/0087893 A1* | 3/2019 | Pellew ............... G06Q 20/3825 |
| 2019/0122300 A1* | 4/2019 | O'Brien ............... G07F 17/3286 |
| 2019/0236298 A1* | 8/2019 | Agarwal ............... H04L 9/3239 |

* cited by examiner

TOKEN-BASED ENTITY RISK MANAGEMENT EXCHANGE

TECHNICAL FIELD

Embodiments herein generally relate to managing risk associated with a business enterprise or other organization and, more particularly, to processes for implementing a token-based risk management exchange.

BACKGROUND

Business enterprises employ risk management systems to assess and mitigate risk associated with their operations. For example, the field of enterprise risk management (ERM) has developed to facilitate competent enterprise governance and adequate internal processes to reduce an enterprise's potential or actual losses. However, the increasing volume and complexity of available information, particularly within an environment of advanced global marketplace interconnectedness and volatility, has caused conventional risk management systems to be inadequate to accurately and efficiently assess risk and to properly record past risk-based decisions. Accordingly, conventional systems are not capable of providing sufficient real-time information about current enterprise risk positions that may be readily understood by a user and that may be recorded in an immutable record of enterprise risk decisions.

DETAILED DESCRIPTION

Figure 1:
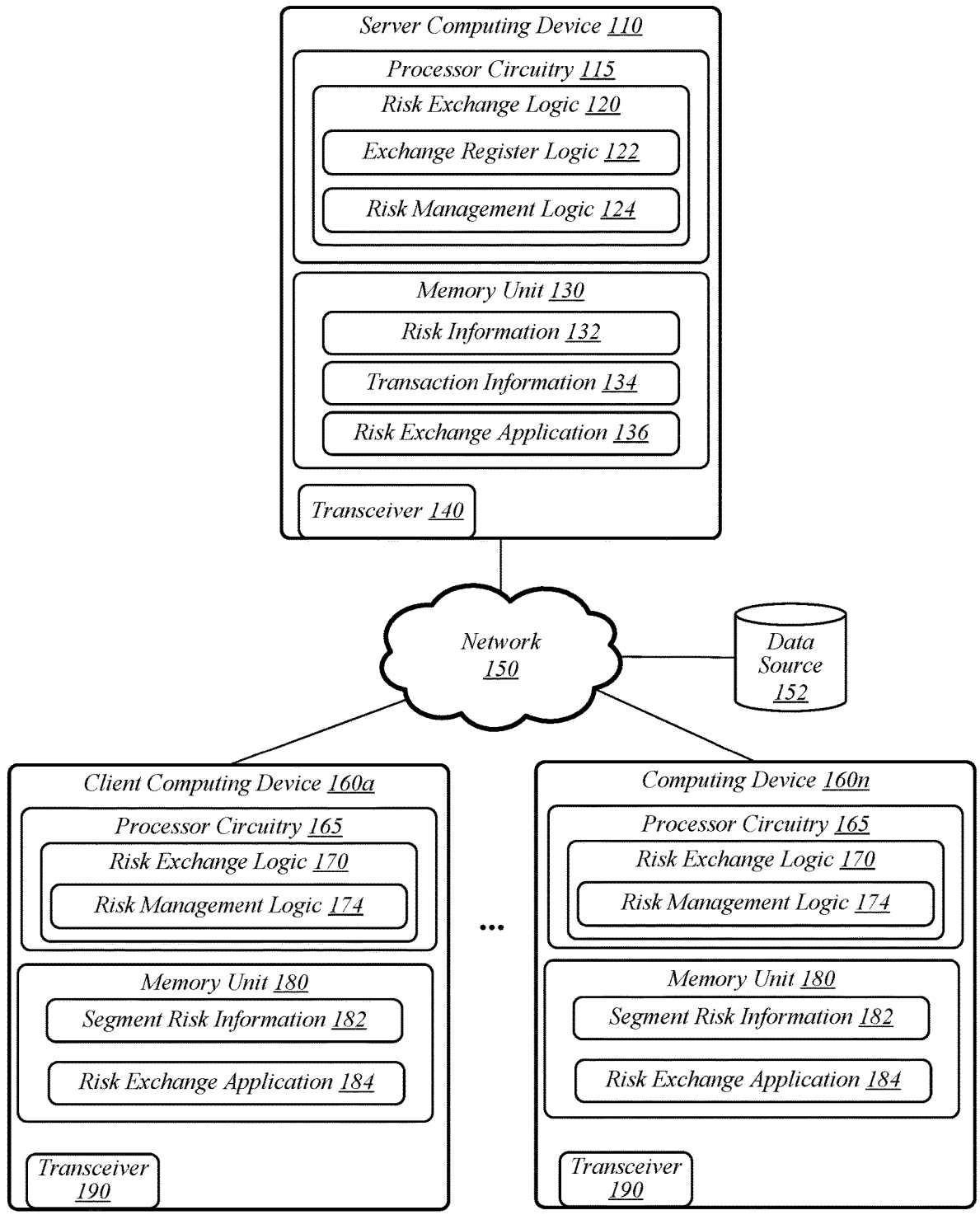
FIG. 1 illustrates an embodiment of a first operating environment.

Various embodiments may generally be directed toward systems, methods, and/or apparatus for implementing a token-based risk exchange platform (or "risk exchange"). In some embodiments, a risk exchange process may operate to implement the risk exchange associated with an entity. For example, the risk exchange may operate to determine a total risk value for the entity. In some embodiments, the total risk value may be configured to quantify, enumerate, or otherwise represent the total risk level of the entity. In various embodiments, the risk exchange process may generate risk tokens operative to represent a portion or share of the total risk value. The risk tokens may be assigned, purchased, or otherwise distributed to segments of the entity. In exemplary embodiments, the risk exchange may allow a segment to manage risk via trading or otherwise transacting with the risk tokens assigned to the segment. Each risk exchange transaction may be recorded in an audit trail or an immutable ledger.

In some embodiments, various risk events may be defined that have a transaction value for a segment to proceed with the risk event. For example, a risk event may require a certain number of tokens for a segment to be assigned or operate with the risk event, conduct the risk event, and/or the like. A risk event may be or may include a business decision for the segment (for instance, a real estate group (segment) of an investment firm (entity) purchasing a commercial property (risk event)). The segment may record the risk event decision in the immutable ledger in exchange for the tokens to proceed with the business decision. In another example, alternatively, if a segment alleviates an associated risk event, the segment may receive tokens in the amount of the transaction value associated with the risk event. In various embodiments, risk decisions or transactions occurring via the risk exchange may be tracked and logged, for example, via an immutable ledger or other data storage structure. In some embodiments, at least a portion of the risk exchange may be implemented using blockchain or a similar immutable data platform.

Token-based risk exchange processes according to some embodiments may provide multiple technological advantages, including improvements to computing technology, over conventional systems and methods. One non-limiting example of a technological advantage is providing visibility into real-time comprehensive state of accepted risk by an entity. Another non-limiting example of a technological advantage may include facilitating a token-based process for buying/selling risk of an entity in a manner that may be easily quantified, recorded, and/or monitored. A further non-limiting example of a technological advantage may include a risk exchange operative to provide a proof-of-trust model for managing risk within an entity. An additional non-limiting example of a technological advantage may include facilitating a market-based approach to managing risk within an entity. A still further non-limiting example of a technological advantage may include providing a risk trading platform for an entity and segments of the entity to trade risk (for instance, alter their individual segment risk position) while maintaining an overall risk position of the entity with certain important safeguards, such as providing an immutable record of risk decisions, limiting the amount of risk a segment, activity, or other element may take on (for instance, by limiting the number of available risk tokens for the segment, activity, and/or the like).

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include computing device (or "server computing device") 110 communicatively coupled to computing devices (or "client computing devices") 160a-n and/or data source 152, for example, via network 150. In some embodiments, computing device 110 and/or computing devices 160a-n may be or may include a stand-alone computing device, such as a personal computer (PC), server, tablet computing device, cloud computing device, mobile computing device (for instance, a smart phone, tablet computing device, and/or the like), data appliance, and/or the like. In some embodiments, computing device 110 and/or computing devices 160a-n may include a plurality of computing devices and/or computing systems (for instance, data centers, cloud computing environments, computing clusters, and/or the like).

Although only one computing device 110 is depicted in FIG. 1, embodiments are not so limited. In various embodiments, the functions, operations, configurations, data storage functions, applications, logic, and/or the like described with respect to computing device 110 may be performed by and/or stored in one or more other computing devices. A single computing device 110 is depicted for illustrative purposes only to simplify the figure.

As shown in FIG. 1, computing device 110 may include processor circuitry 115, a memory unit 130, and a transceiver 140. Processor circuitry 115 may be communicatively coupled to memory unit 130 and/or transceiver 140.

Processor circuitry 115 may include and/or may access various logic for performing processes according to some embodiments. For instance, processor circuitry 115 may include and/or may access risk exchange logic 120, exchange register logic 122, and/or risk management logic 124. Processing circuitry 115, risk exchange logic 120, exchange register logic 122, and/or risk management logic 124, and/or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 800. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chipsets, software components, programs, applications, firmware, software modules, computer code, combinations of any of the foregoing, and/or the like.

Although risk exchange logic 120 is depicted in FIG. 1 as being within processor circuitry 115, embodiments are not so limited. In addition, although exchange register logic 122 and risk management logic 124 are depicted as being a logic of risk exchange logic 120, embodiments are not so limited, as exchange register logic 122 and/or risk management logic 124 may be separate logics and/or may not be standalone logics but, rather, a part of risk exchange logic 120. For example, risk exchange logic 120, and/or any component thereof, may be located within an accelerator, a processor core, an interface, an individual processor die, implemented entirely as a software application, and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Computing device 110 may be a server or host computing device or system for the risk exchange. Computing devices 160a-n may be client computing devices operated by users to access the risk exchange and/or services thereof, for example, implemented at least in part via risk exchange logic 120. Computing devices 160a-n may be or may include smart phones, tablet computing devices, laptop computing devices, PCs, work stations, and/or the like. In various embodiments, computing devices 160a-n may include processing circuitry 165, memory unit 180, transceiver 190, display 192, and/or I/O 192. Computing devices 160a-n may include risk exchange logic 170 operative to execute a risk exchange application 184. In various embodiments, risk exchange application 184 may be a client application, internet browser application and/or module, mobile application ("mobile app" or "app"), and/or the like operative to interact with risk exchange application 136. For example, risk exchange logic 170 may provide client access to segment risk information 182 (for instance, allocated risk and/or associated risk tokens), risk information 132, transaction information 134, and/or services provided by risk exchange logic 120 and/or components thereof.

Memory unit 130 of computing device 110 may store a risk exchange application 136 that may operate, alone or in combination with risk exchange logic 120, to perform various functions according to some embodiments. For example, risk exchange application 136 may be or may include an application operative to implement functionality of risk exchange logic 120, exchange register logic 122, and/or risk management logic 124.

In various embodiments, risk exchange logic application 136, for example, via risk exchange logic 120, may operate to provide a risk exchange process to implement a risk exchange according to some embodiments (see, for example, FIGS. 4-7). For example, risk exchange logic 120 may operate to determine risk information 132, including, without limitation, a total risk value for an entity and allocated risk amounts for entity segments. In some embodiments, risk exchange logic 120 may operate to tokenize the risk value to generate a plurality of risk tokens, determine a segment risk value for each segment of entity operating on the risk exchange, assign tokens to the segment, and/or manage buying, selling, or other transacting of tokens via the risk exchange. In various embodiments, the tokens may operate the same or similar to a cryptocurrency implemented via a blockchain, such as Bitcoin, Ethereum, or other block-based chain cryptocurrency. In some embodiments, an entity may include a plurality of segments. In various embodiments, an entity may include a single segment (i.e., the risk exchange may operate only on the entity). Accordingly, in various embodiments, the level of risk of an entity may be quantified and expensed by an aspect of the entity (for instance, one or more segments or the entity itself).

In some embodiments, exchange register logic 122 may operate to record transactions occurring on risk exchange. In various embodiments, risk events and/or transactions occurring via risk exchange may generate transaction information 134. In some embodiments, transaction information 134 may include a database. In various embodiments, transaction information 134 may be or may include an immutable or distributed ledger, such as a blockchain (see, for example, FIGS. 2A and 2B).

A blockchain is a particular implementation of a distributed ledger that includes a shared, replicated ledger that is formed of unchangeable data in packages called blocks. A blockchain sits below a distributed ledger and acts as a way to order and validate the transactions in the ledger. Non-limiting examples of distributed ledgers (or blockchain implementations thereof) may include Bitcoin, Ethereum, ERIS, Tendermint, Hyperledger, Axoni, Chain, R3, itBit, Clearmatics, Blockstack, Factom, Open Assets, Tierion, combinations thereof, variations thereof, and/or the like.

Various implementations of a distributed ledger may include characteristics including, without limitation, a ledger, consensus, cryptography, provenance, and immutability. The ledger may include a shared, permissioned ledger which may operate as an append-only system of record in which new records may only be appended to the ledger and existing records cannot be deleted or modified. All participants within a network may have their own identical copy of the ledger and any changes to the ledger are reflected in all copies. Consensus is required to add information to the ledger. For example, in order for a new record or block to be created or a transaction to be written to an existing block, the record must be validated by a consensus algorithm. In general, a consensus protocol agreed to by participating members ensures that the ledger is updated only with network-verified transactions and, as a result, that all participants (or a threshold number of participants) agree on the network's validity. Non-limiting examples of consensus algorithms may include proof-of-work, Byzantine fault-tolerant replication, proof-of-stake, proof-of-trust, multi-signature, and/or the like. In some embodiments, transaction information 134 may be implemented as a proof-of-trust blockchain platform.

Distributed ledgers use cryptography to maintain a peer-to-peer distributed, time-stamped and immutable consensus ledger of all past transactions. Each transaction (or record of a transaction) is similar to a ledger line item, which is then aggregated with others into a block of records or transactions, essentially forming a chain of records (or blocks for a blockchain implementation), with each record connected to the previous record. For example, a distributed ledger involves a chain of cryptographic hashes in which each record contains a cryptographic hash to the previous record. The cryptographic hash may provide assurance as to the integrity of a record, for instance as a checksum, because any change to the contents of the record will result in a completely different cryptographic hash being produced. With each record referring back to the previous record, it is not possible to insert a new block or alter an existing record's contents, thus providing a range of guarantees as to the integrity of the order and contents of the records.

The provenance of a distributed ledger may generally refer to sources/processes that produce information/data. In cryptography, provenance may provide the linkage and other information to determine a source of information and/or a record. As such, distributed ledger technology can be used to determine the provenance of an asset or information, which may determine a source and/or a history of ownership of the asset or information. In addition, distributed ledgers may demonstrate immutability because exchange participants cannot tamper with transactions once they are recorded in the distributed ledger. For example, if a record or transaction is the result of an error, another record or transaction must be added to correct the error and both transactions (the original, erroneous record, and the corrected record) must be left visible to the exchange participants.

Distributed ledger technology may be used to implement smart contracts, which may include programmable contracts capable of automatically enforcing themselves when pre-defined conditions have been met. For example, a smart contract may include the terms of a contract between at least two entities. The smart contract operates to monitor information and/or events to trigger the pre-defined conditions. When the pre-defined conditions are met, the contract is executed and the smart contract may provide data for compliance and reporting (for instance, as a record within the distributed ledger). For example, smart contracts may be used to implement tokens (for instance, risk tokens) according to some embodiments and described in more detail herein. For example, a smart contract may transfer a certain amount of risk tokens to a wallet associated with a segment responsive to the smart contract conditions being met (for instance, the entity has the requisite amount of risk tokens and is transacting for a permitted risk event). Embodiments are not limited in this context.

Figure 2A:
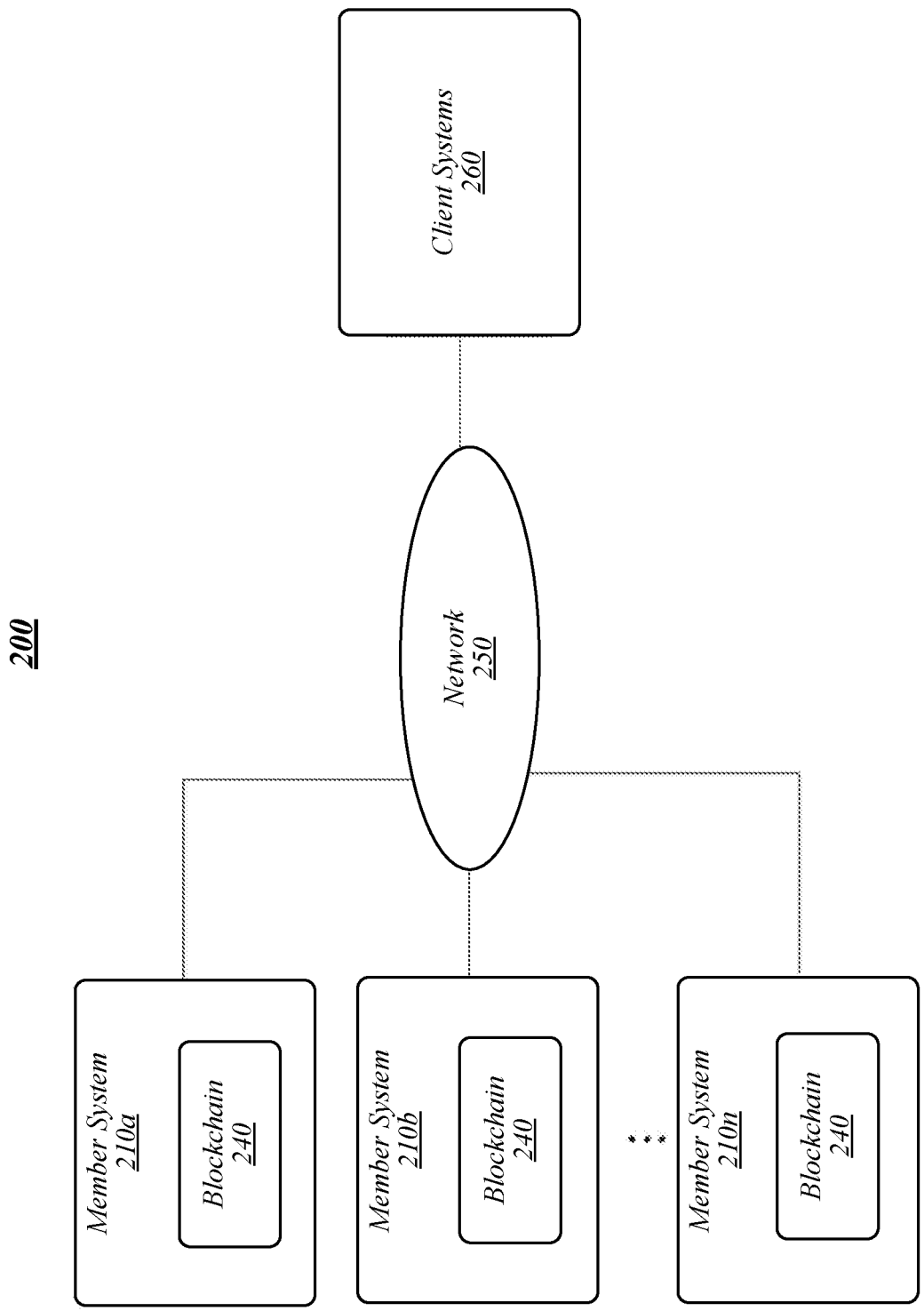
FIG. 2A illustrates an embodiment of a second operating environment.

FIG. 2A illustrates an example of an operating environment 200 that may be representative of some embodiments. More specifically, FIG. 2A depicts a schematic of an exemplary blockchain implementation of a risk exchange according to some embodiments. The blockchain implementation may comprise systems with access to blockchain 240 over a network 250.

The blockchain implementation can generate a non-repu-table record of interactions using blockchain 240. Furthermore, blockchain 240 can be distributed, encouraging trust in the validity of the records stored in the blockchain 240. Member systems 210a-n may include the embodiment of blockchain 240, with each member system 210 having a local copy of the most recent version of blockchain 240. Member systems 210 may be one of several nodes in blockchain 240 responsible for completing data blocks and adding the completed data blocks to blockchain 240, as described below (see, for example, FIG. 2B). Member systems 210 may comprise one or more computing devices, such as a server, a server farm, a workstation, a desktop computer, or a special-purpose computing device. Member systems 210 may be standalone or may be part of a subsystem, which may be part of a larger system. For example, member systems 210 may be associated with a business enterprise. Member systems 210 may include distributed servers that are remotely located and communicate with other systems of the business enterprise over a public network or over a dedicated private network. In some embodiments, blockchain 240 may be a private centralized blockchain, for example, only accessible within a single enterprise associated with a risk exchange. In various embodiments, blockchain 240 may be public, for example, implemented on a decentralized public network. For example, public stakeholders external to an enterprise may have access to blockchain 240 and/or risk exchange. Non-limiting examples of public stakeholders may include individual investors, outside investment firms, auditors, regulators, and/or the like. For instance, stakeholders may have view-only access or may be limited to certain public-accessible transactions (for instance, implemented via a smart contract). In exemplary embodiments, portions of risk exchange and/or blockchain 240 may be private and other portions may be public.

Client systems 260 may use the facilities of distributed blockchain 240 without being members of the blockchain 240. As such, client systems 260 may not necessarily act as a node in the blockchain network, that is, client systems 260 may not participate in the completion of blocks in blockchain 240. In some embodiments client systems 260 may have a local copy of the distributed blockchain 240 for read-only access, while in other embodiments, client systems 260 may not have a local copy of the distributed blockchain 240 but must rely on member systems 210 to access data stored in blockchain 240. In some embodiments, client systems 260 may pay a fee in exchange for the ability to use blockchain 240. client systems 260 may comprise one or more computing devices, such as a server, a server farm, a workstation, a desktop or a special-purpose computing device. client systems 260 may include distributed servers that are remotely located and communicate with other systems of the financial institution over a public network, or over a dedicated private network (for example, to implement a public blockchain 240 and/or risk exchange).

Blockchain 240 may comprise a distributed data structure, consistent with disclosed embodiments. Blockchain 240 may be configured as a public, private or consortium blockchain, or a combination thereof. For example, member systems 210 may store local copies of blockchain 240. The member systems 210 may be configured to add blocks to blockchain 240, complete the data blocks and publish the data blocks to other member systems 210. Member systems 210 may be configured to receive records containing information regarding risk exchange transaction and their associated metadata from client systems 260 for publication in blockchain 240. Client systems 260 may have read-only access to blockchain 240.

Network 250 may be configured to provide communications between the components of FIG. 2A. For example, network 250 may be any type of network (including infrastructure) that provides communications, exchanges information, and/or facilitates the exchange of information, such as the Internet, a Local Area Network, or other suitable connection(s).

Figure 2B:
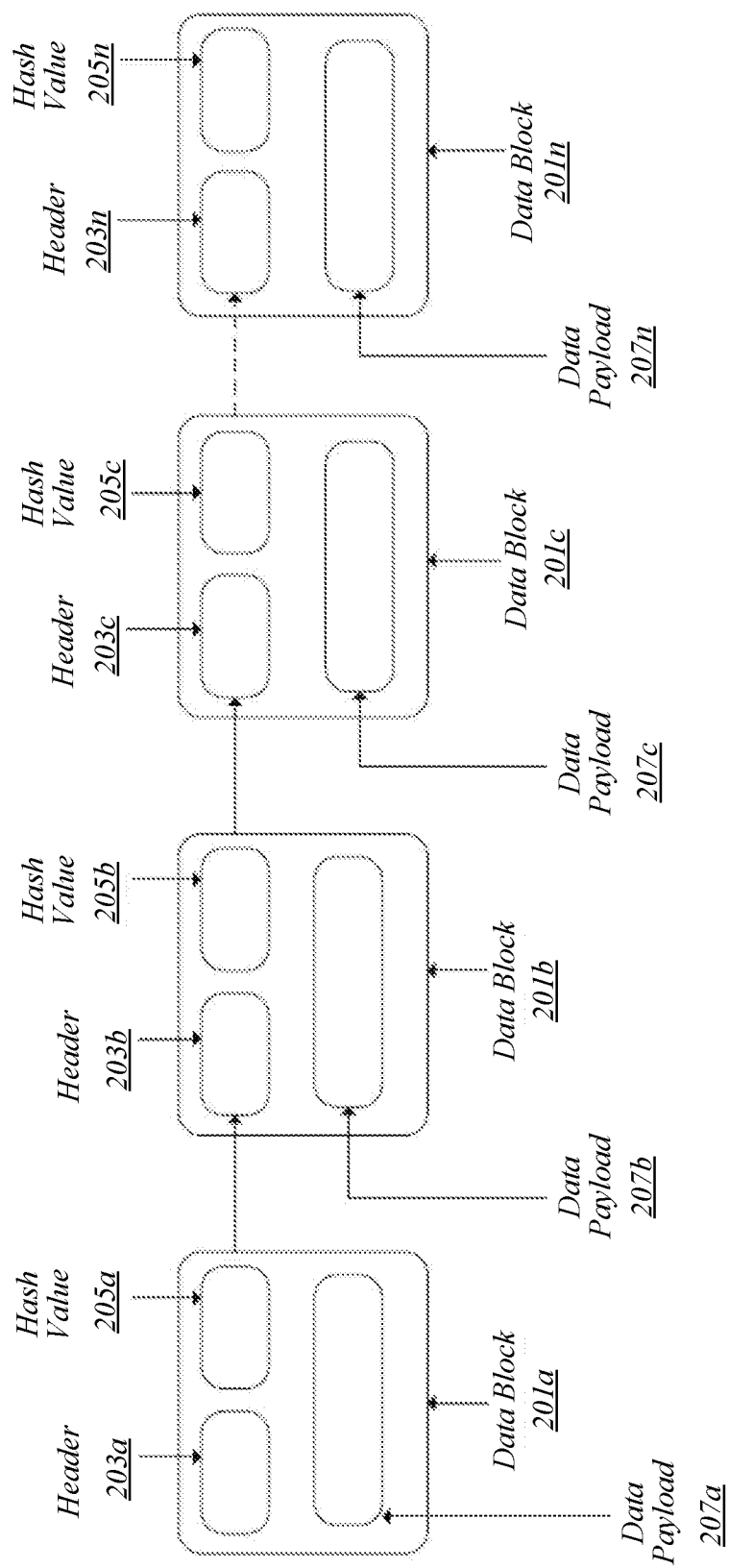
FIG. 2B illustrates an exemplary blockchain.

FIG. 2B depicts a logical model of an exemplary blockchain 240, consistent with disclosed embodiments. Blockchain 240 consists essentially of a series of data blocks 201a-n linked together in a manner described below. Data blocks 201 consists of a header 203, a data payload 207 and the hash value 205. The hash value 205n of each data block 201n is included in the header 203n+1 of the next data block 201n+1 in the blockchain 240, thereby creating the chain.

Member systems 210 may be configured to store data payloads 207 in data blocks 201 in blockchain 240, consistent with disclosed embodiments. In some aspects, member systems 210 may be configured to create new data blocks 201 for addition to blockchain 240, data blocks 201 containing a data payload 207, data payload 207 comprising one or more records containing one or more transactions occurring on the risk exchange and the metadata related to the transactions. In various aspects, member systems 210 may be configured to accept records for storage in blockchain 240 from client systems 260.

As described in detail with respect to FIG. 2B, blockchain 240 may be configured to store data payloads 207 from member systems 210, the data payloads 207 including one or more records, as described below. Blockchain 240 may be distributed and comprise many copies of blockchain 240 maintained by different systems or nodes, for example, member systems 210 may each have a local copy of the most recent version of blockchain 240. Such exemplary blockchains may comprise blocks, such as data blocks 201a-n. A data block 201n may include data payloads, such as data payload 207n, each data payload containing one or more records. Generally, data blocks 201 include a header, such as headers 203a-n, which uniquely identifies each block. The headers 203 may include a hash value generated by a hash function. For example, a header 203n may include at least the hash value of the previous block 203n-1 and may also include one or more of a hash value generated based on any data payload 207 in the data block 201, (e.g., a Merkle root), and a timestamp.

Consistent with disclosed embodiments, to be added to blockchain 240 each data block 201, must be completed by calculating a hash value 205 for that data block 201. In some embodiments, a hash value 205 may be a simple hash of the data block 201. In other embodiments hash value 205 may be the result of the satisfaction of a proof-of-work condition. Headers 203 may include a nonce chosen to ensure that the hash value 205 satisfies a proof-of-work or proof-of-trust condition.

Additionally, header 203 may be digitally signed with a cryptographic key of a member system 210, and the digital signature may be included in the header 203. This digital signature may be verified using a key available to the member systems 210.

Blockchain 240 may comprise one or a combination of several different types of blockchain. In one embodiment, blockchain 240 may comprise a private blockchain, which may be a consortium blockchain in which only member systems 210 may complete blocks but which may also include user systems 214 which may publish records for inclusion in blocks and which may read the blockchain. The private blockchain may allow only member systems 210 to have copies of blockchain 240 or may allow both member systems 210 and user systems 214 to have copies of blockchain 240, but only allow member systems 210 to complete blocks for inclusion in blockchain 240.

In yet another embodiment, blockchain 240 may comprise a public blockchain in which any node may participate in the blockchain 240 and complete blocks in blockchain 240. In such cases, it may be desirable that data payloads 207, or individual records in data payloads 207, be encrypted before being included in the data payload 207 of a data block 201.

Cryptographic keys may be used to encrypt elements of data payloads 207 in data blocks 201, consistent with disclosed embodiments. In some aspects of the invention, such cryptographic keys may be associated with member systems 210. Corresponding cryptographic keys may be available to decrypt the encrypted data payloads, consistent with disclosed embodiments. For example, when a data payload in a block is encrypted with a symmetric key, the same symmetric key may be available for decrypting the encrypted element. As another example, when a data payload of a message in a block is encrypted with a private key, a corresponding public key may be available for decrypting the encrypted element. In some aspects of the invention, the corresponding cryptographic keys may be available to member systems 210.

Figure 3:
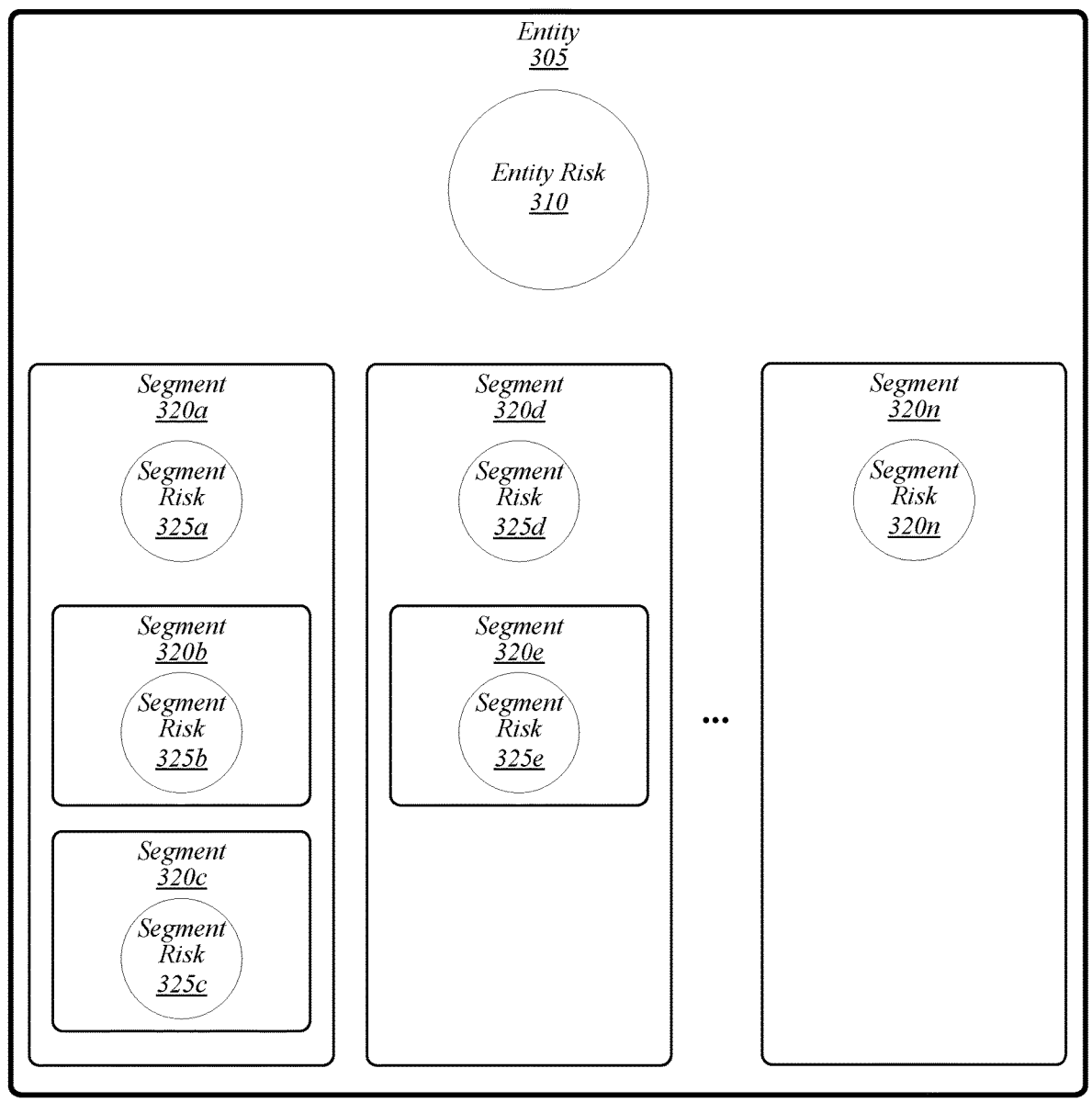
FIG. 3 illustrates an embodiment of a third operating environment.

FIG. 3 illustrates an example of an operating environment 300 that may be representative of some embodiments. As shown in FIG. 3, an entity 305 may be associated with an entity risk 310. Entity 305 may include any distinct organization, enterprise, object, activity, portions thereof, components thereof, combinations thereof, and/or the like. In general, an entity may include any discrete element that may be associated with risk. Non-limiting examples of an entity may include a manufacturer, a product developer, a social network provider, a marketing firm, a financial services enterprise, a pharmaceutical manufacturer, a business organization, a municipality, an investment firm, a software developer, a business transaction, and/or the like. Entity 305 may include one or more segments 320a-n. A segment 320a-n may include any sub-unit or activity of entity 305. For example, segments 320a-n may include an individual (for instance, an employee), a department, a team, a project, a transaction (for instance, an entity purchasing a target company, a manufacturing segment purchasing materials, a developer hiring contractors, and/or the like), a division, a subsidiary, a product, a service, a business sector, any aspect of the entity, and/or the like. In some embodiments, a segment 320a-n may include other segments (or sub-segments). In general, an entity 305 contains or is a container for segments 320a-n (for example, in a first implementation company may be the entity 305 and a department may be the segment 320a-n, while in a second implementation, the department may be the entity 305 and a product may be the segment). Embodiments are not limited in this context.

Entity risk 310 may be a total entity risk value configured to represent the total amount of risk for the entity. For example, entity risk 310 may represent the risk appetite or risk position of entity 305, which may be the total level of risk entity 305 is prepared to accept. In some embodiments, entity risk 310 may be a numerical value, currency value, and/or the like. In other embodiments, entity risk may be a level, such as high, low, and/or the like. The amount of entity risk 310 may be arbitrary because it may be used to define the universe of risk for entity 305 within an associated risk exchange without reference to external values and/or because it depends on the quantification of the underlying risk decisions (for example, required tokens). In various embodiments, the amount of entity risk 310 may be defined automatically, for example, by risk exchange logic 120, for example, based on entity information, historical information, industry information, market conditions, regulatory requirements, risk parameters, and/or the like. In some embodiments, the amount of entity risk 310 may be defined by an individual associated with entity, such as a chief executive officer (CEO), risk manager, and/or the like. In various embodiments, the amount of entity risk 310 may be determined based on a combination of risk exchange logic 124 and user input. Embodiments are not limited in this context.

In some embodiments, entity risk 310 may be a static or substantially static value. For example, once entity risk 310 has been defined, it may not be changed for a specified period (including, for instance, the entire operation of the associated risk exchange). For example, entity risk 310 may be set at 1,000,000 (for instance, entity risk units or token values), and apportioned to segments 320a-n. In other embodiments, the value of entity risk 310 may be dynamic, changing based on one or more exchange conditions. Non-limiting examples of exchange conditions may include market conditions, stock market values, entity financials, risk appetite, and/or the like. For instance, negative/positive market conditions or entity financials may cause entity risk 310 to decrease/increase by a certain amount (for example, 10%). In various embodiments, changes to entity risk 310 (for example, a 10% increase) may be passed onto segments 320a-n evenly (for instance, an across-the-board decrease/increase) or differentially (for example, each segment gets a determined share of decreases/increases (including zero). In various embodiments, segments 320a-n may be associated with a change factor or weight indicating how entity risk 310 decreases/increases may be applied. For example, segment 320a may have a factor of ½, such that segment 320a receives ½ of any decrease/increase. In another example, a segment 320a-n may have a first factor for decreases and a second factor for increases.

Each segment 320a-n may be assigned a total segment risk value (or segment risk) 325a-n configured to indicate the allocated risk or risk appetite for the particular segment. As with entity risk 310, segment risks 325a-n may be determined automatically by risk exchange logic 120 and/or user input. In various embodiments, segment risks 325a-n may not be evenly distributed. For example, segment 320a may be allocated a greater segment risk 325a (for instance, 100 risk units) than segment risk 325b (for instance, 50 risk units) of segment 320b. In some embodiments, segment risk 325a-n may be configured to represent the portion of total entity risk 310 allocated to a particular segment 320a-n. For example, total entity risk 310 may equal X, and segment risk 325a may equal X/10, segment risk 325b may equal X/5, and so forth.

Figure 4:
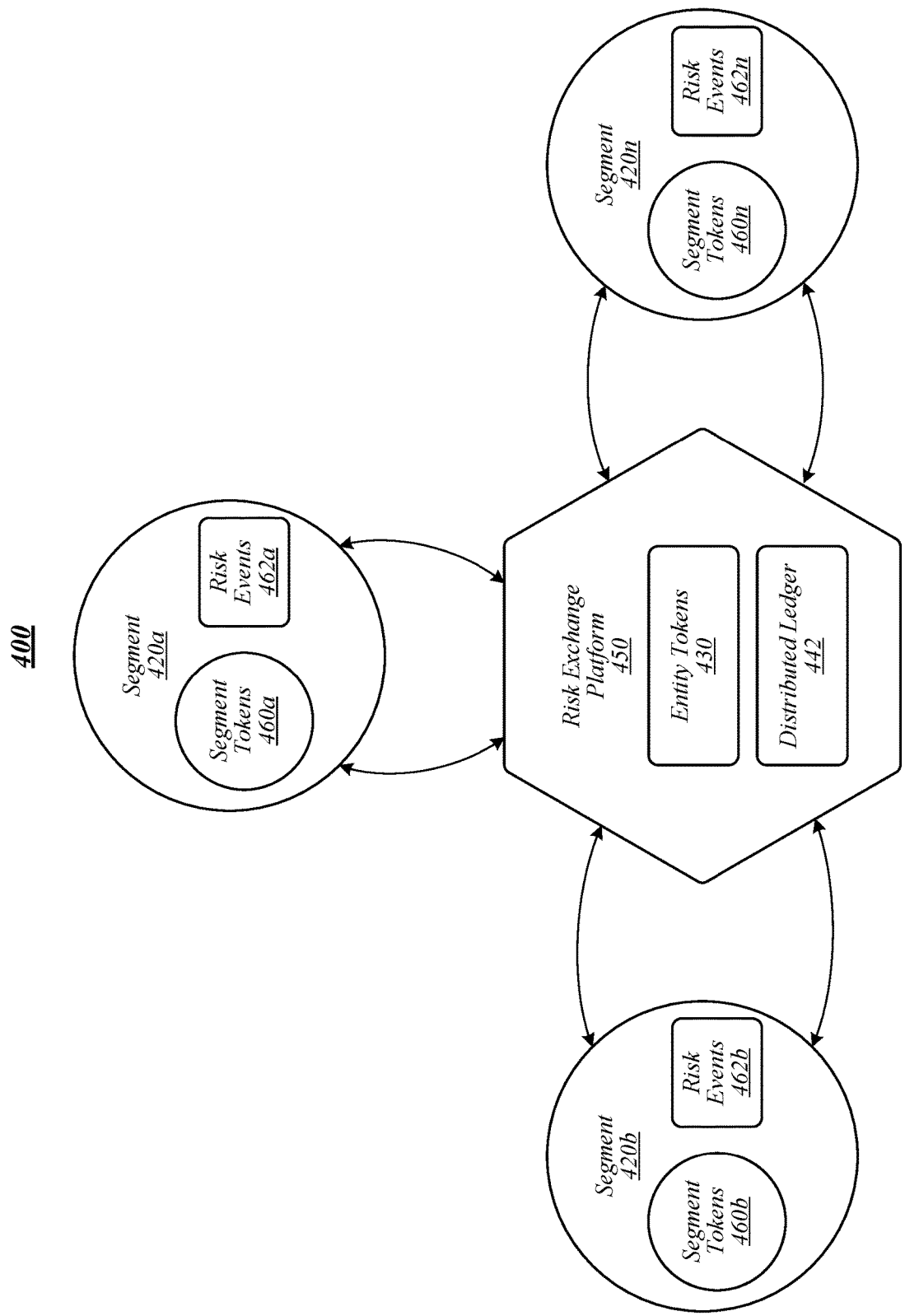
FIG. 4 illustrates an embodiment of a fourth operating environment.

FIG. 4 illustrates an example of an operating environment 400 that may be representative of some embodiments. As shown in FIG. 4, operating environment 400 may include a risk exchange platform 450. In some embodiments, risk exchange platform 450, for example, via risk management logic 124, may be operative to tokenize risk associated with risk exchange platform 450. For example, the total entity risk (for instance, entity risk 310) may be converted into a plurality of risk tokens. Risk exchange 450 may implement risk tokens according to various processes. In a blockchain implementation of risk exchange 450, tokens may be implemented according to an Ethereum protocol. Embodiments are not limited in this context.

In some embodiments, risk exchange 450 may operate to track and log risk decisions via distributed ledger 442. In various embodiments, distributed ledger 442 may be implemented as a blockchain, for example, a proof-of-trust blockchain platform operate to provide a clear audit trail of both macro-level and micro-level risk decisions.

In various embodiments, the total entity risk may be divided into discrete units, with each token representing a portion of the total entity risk. In some embodiments, each of the plurality of risk tokens has the same value. Accordingly, the value of each risk token=(entity risk value)/(number of tokens). In various other embodiments, risk tokens may have different values. Segments 420a-n may receive segment tokens 460a-n that may be used for transactions via risk exchange 450. In some embodiments, not all of the available tokens may be distributed; instead, remaining with the entity as entity tokens 430. For example, an entity may have a total risk value of 1,000,000 risk units. Risk exchange 450 may tokenize the total risk value to generate risk tokens having a value of 1 risk unit (or "token value") each, for a total of 1,000,000 risk tokens. Segment tokens 460a-n may total 300,000 risk tokens (for instance, segment tokens 460a=100,000; segment tokens 460b=50,000; and segment tokens 450c=150,000), leaving 700,000 non-distributed entity tokens 430 available on risk exchange 450. In general, risk exchange 450 may have a pool of risk tokens, where risk tokens distributed to segments 420a-n may be designated as segment tokens 460a-n and non-distributed tokens may be designated as entity tokens 430, although there may not be a functional, nominal, or structural difference between segment tokens 460a-n and entity tokens 430.

In various embodiments, entity tokens 430 may be distributed based on various distribution factors. In a block-chain implementation, a smart contract may be used to implement or enforce token distribution. For example, entity tokens 430 may be distributed to segments 420a-n based on entity policies (for instance, favoring a first type of risk (real estate investments) over a second type of risk (emerging market investments), product generation pipelines (for example, different risk postures for different points in the pipeline), checkpoints (for instance, on a fiscal calendar quarterly basis, achievement of milestones, stock value thresholds, and/or other metrics), and/or the like. In some embodiments, risk exchange 450 may perform an initial distribution for each segment 420a-n and for any new segments 420a-n joining risk exchange 450. In various embodiments, risk exchange 450 may implement periodic rebalancing, for example, on a time basis (for instance, daily, quarterly, and/or the like) or based on certain triggering events (for instance, changes in risk posture, threshold value of tokens, threshold number of available entity tokens, market conditions (for example, stock price)), and/or the like).

In some embodiments, the value of a risk token, more specifically, a risk unit or token value represented by a risk token, may fluctuate the same or similar to a foreign exchange market. In some embodiments, the value of a risk unit may be modified through the addition/removal of entity tokens 430 and/or segment tokens 460a-n into risk exchange 450. In various embodiments, the value of a risk unit may be modified based on inflationary/deflationary pressures based on various exchange factors, such as entity risk appetite, number of transactions, entity activity, market conditions, entity financial conditions, risk strategy, entity value (for instance, stock price, and/or the like) and/or the like. Embodiments are not limited in this context. For example, an entity may decide to modify their risk posture, such as seeking to reduce/increase risk by a certain percentage. Accordingly, the cost of risk may be manipulated via risk exchange 450 by modifying the value/amount of tokens, for example.

In various embodiments, risk exchange 450 may determine a segment risk value for each segment 420a-n (see, for example, FIG. 3). In general, a segment risk value may be or may include the amount of risk allocated to a particular segment 420a-n. Risk exchange 450 may distribute segment tokens 460a-n to segments 420a-n to correspond with the segment risk value associated with segments 420a-n. For example, if segment 420a has a segment risk value of 100 risk units and each risk token has a value of 1 risk unit, risk exchange 450 may distribute 100 risk tokens to segment 420a.

In various embodiments, risk exchange 450 may categorize different types of risks (or "risk events") 462a-n. In general, any type of function or activity by a segment may be determined to be a risk event 462a-n, such as a purchase, product launch, strategy, use of a particular product or platform, cyber security decisions, investments, human resources, and/or the like. In various embodiments, risk events 462a-n may be categorized and valued. In various embodiments, risks or risk events 462a-n may include different types and/or categories of risk. For example, risk may include financial risks, legal risks, cyber security risks, vulnerabilities, data loss, secure configuration risks, social media risks, and/or the like. In addition, each type of risk may be categorized, such as "high," "medium," "low," on a numerical scale, and/or the like. In exemplary embodiments, each type and/or category of risk may be associated with a specific risk value (or tokens). For example, each risk (or risk event) in category 1 may be 100 tokens, each risk in category 2 may be 500 tokens, and so forth. In another example, risk values may be segment-based, such risks for certain entity departments (manufacturing), managers (for instance, manager level or a manager-specific risk factor), activities (more tokens for new product development versus existing product enhancements), and/or the like may have a certain number, value, or range of tokens.

In some embodiments, risk exchange 450 may assign a risk transaction value to a risk event 462a-n or risk category. The risk transaction value may indicate a number of tokens required by a segment to perform or be associated with the risk event 462a-n. In general, the risk transaction value operates to quantify the cost of the risk (for example, in the form of tokens). Risk events 462a-n may be quantified based on various risk cost factors, such as market conditions, risk appetite, entity strategy, and/or the like. For example, a risk transaction value may be based on the probability of a negative event associated with the risk occurring (for example, negative media coverage) or the impact of an event (for example, a catastrophic cyber security breach event). For instance, in some embodiments, automatically and/or via user input, risk events 462a-n may be assigned a risk transaction value based on one or more cost factors, such as an initial risk value, multiplied by an event probability factor and/or a catastrophic scaling factor. For example, beta testing a software product with customers may be a risk event 462a-n having a risk transaction value of 500 tokens. Accordingly, a segment 420a-n may exchange 500 tokens 460a-n on risk exchange platform 450 to beta test the software product. In another example, using a first network security application may be a first risk event having a risk transaction value of 200 tokens, while using a second (less robust and less expensive) network security application may be a second risk event having a risk transaction of 400 tokens. A segment 420a-b may choose the first risk event (200 tokens) or second risk event (400 tokens) as a transaction via risk exchange 450 which is recorded in distributed ledger 442. In some embodiments, a risk transaction value may be dynamic, changing based on certain risk factors. For example, if a risk event is being exploited (risk exploitation detection or event), then the associated risk transaction value may be increased.

In another example, one or more risk events 462a-n may involve the total risk acceptable for a software product launch. Risks including, without limitation, vulnerabilities, controls, and/or the like may be considered to increase/ decrease the overall risk allowance, which may be controlled based on the spending or receiving of tokens via risk exchange 450. In some embodiments, the total acceptable risk and the spending/receiving of tokens may be managed by smart contracts of a blockchain implementation of distributed ledger 442. In this manner, risk may be automatically and programmatically controlled, while being archived in distributed ledger 442.

In some embodiments, a segment 420*a-n* may be associated with a certain set of risk events 462*a-n* having a total risk transaction value, indicating a total risk associated with the segment 420*a-n*. A segment 420*a-n* may have a risk balance resulting from subtracting the total risk transaction value from the value of tokens 460*a-n*. For example, segment 420*a* may have 800 tokens and risk event 462*a* with a total risk transaction value of 500 tokens. Accordingly, segment 420*a* may have a risk balance of 300 tokens. Segment 420*a* may remove a risk event 462*a* having a risk transaction value of 100 tokens, (for instance, by addressing or otherwise removing a risk vulnerability) increasing the risk balance of segment 420*a* by 100 tokens to 400 tokens.

For example, a segment manager may oversee a software application with 10 vulnerabilities or risks, each worth 50 tokens (for a total of 500 tokens). The segment manager may accept this risk and the 500-token cost. The segment manager may solve a vulnerability (for instance, develop/fix a software module to address a vulnerability) and transact to remove the risk event 462*a-n* to receive 50 tokens. Alternatively, a segment manager may oversee a segment with a 300-token balance. The segment manager may trade for or purchase risk, for example, take on a risk event 462*a-n*, by exchanging the risk event 462*a-n* for tokens. For example, a segment manager may save costs by outsourcing product development, but increase the segment risk posture in doing so. The segment manager may accept the risk tradeoff to decrease budget expenses for the segment. Accordingly, segment manager may purchase an outsourcing risk event 462*a-n* by trading or otherwise exchanging tokens 460*a-n* with risk exchange 450.

In another example, segment 420*a* may be an information technology (IT) department that has decided to proceed with a certain decision or course of action, such as storing information in a third-party cloud service, having a risk transaction value of 200 tokens. Segment 420*a* may trade, purchase, transfer, or otherwise transact for the decision as a risk event 462*a* via risk exchange 450. For example, segment 420*a* may exchange 200 tokens 460*a* for the decision to be a part of risk events 462*a*, which may be recorded as a transaction in distributed ledger 442. Accordingly, in some embodiments, a risk event 462*a-n* may be or may include a decision being encoded in distributed ledger (for instance, a block chain) in exchange for tokens. For example, risk exchange 450 may perform a risk transaction via exchanging a portion of tokens 460*a-n* of segments 420*a-n* for assignment of a risk event 462*a-n* to segment 420*a-n*. In this manner, risk exchange 450 may facilitate the trading/buying/selling of tokens in exchange for risk, with each transaction (for instance, risk decision) being immutably recorded in distributed ledger 442. In some embodiments, if a segment 420*a-n* takes on or buys risk (for instance, a risk event 462*a-n*), the segment 420*a-n* may exchange the risk for segment tokens 460*a-n*. These segment tokens 460*a-n* may be used to purchase the risk event 420*a-n* and, in some embodiments, may be transferred to entity tokens 430. In this manner, the total risk position of an entity may be maintained, while the individual risk positions of segments may change.

In some embodiments, a transaction may include transaction information (for instance, transaction information 134) that may include, without limitation, transaction time stamp, transacting segment, initiating manager or other associate, risk event information, number of tokens, acceptance/denial of transaction, and/or the like.

A segment 420*a-n* may not have enough tokens 460*a-n* to purchase or to be assigned a risk event 462*a-n*. In some embodiments, segments 420*a-n* may request an exception to receive more tokens 460*a-n* or risk where they do not have sufficient tokens 420*a-n*. For example, an exception may be granted in the form of allocating more entity tokens 430 to a requesting segment 420*a-n*. In various embodiments, risk exchange 450 may ensure that entity tokens 430 allocated responsive to an exception request may only be used for risk events 462*a-n* associated with the request. In another example, an exception request may be granted in the form of assigning the requested risk event 462*a-n* to a requesting segment 420*a-n* without requiring an exchange of the full amount of tokens 462*a-n* required for the risk event 462*a-n*. In various embodiments, exchange platform 450 may operate to enforce a minimum balance for each segment 420*a-n*, for example, to handle unanticipated risks for each segment 420*a-n*.

In some embodiments, segments 420*a-n* may only transact tokens 460*a-n* with risk exchange 450 and not with other segments 420*a-n*. In other embodiments, segments 420*a-n* may exchange tokens 460*a-n* with other segments 420*a-n*. For example, in some embodiments, segments 420*a-n* may request an exception to provide tokens 460*a-n* to another segment 420*a-n* (for example, in exchange for something within or external to risk exchange 450). In another example, segments 420*a-n* may be permitted to exchange tokens 460*a-n* below a threshold amount with other segments 420*a-n* without requesting an exception, permission, and/or the like.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by executable computer instructions stored on a non-transitory computer readable medium or machine-readable medium, such as an optical, magnetic or semiconductor storage. The embodiments are not limited in this context.

Figure 5:
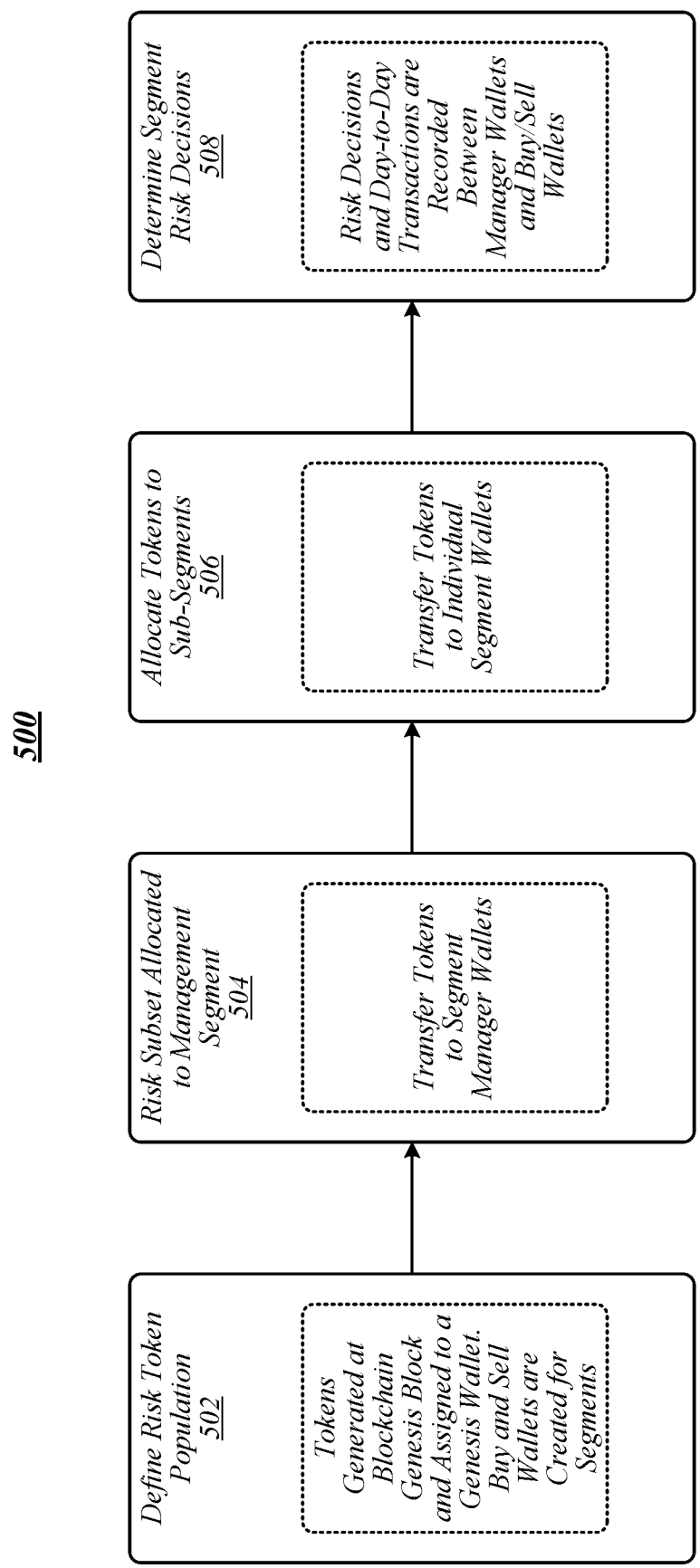
FIG. 5 illustrates an embodiment of a first logic flow.

FIG. 5 illustrates an embodiment of a logic flow 500. Logic flow 500 may be representative of some or all of the operations executed by one or more embodiments described herein, such as computing device 110 and/or risk exchange 450. In some embodiments, logic flow 500 may be representative of some or all of the operations of a risk exchange process according to some embodiments.

At block 502, logic flow 500 may define a risk token population. In some embodiments, a population of tokens may be generated at a blockchain genesis block (for instance, block 0 of a blockchain) and assigned to a genesis wallet. In some embodiments, risk tokens may be or may include a crypto-token (for example, an Ethereum token and/or the like) issued via a core genesis block of a blockchain of the risk exchange. For example, entity tokens 430 may be assigned to a genesis wallet associated with the genesis block of the blockchain. Each segment may be associated with one or more segment wallets, such as buy and sell wallets, segment manager wallets, sub-segment wallets, and/or the like.

Logic flow 500 may allocate risk subsets to management segments at block 504. Accordingly, risk subsets may be allocated to entity leadership (management-level, board-level, officer-level, and/or the like) for a macro view of risk. The allocation of risk subsets may be the first division of the total risk token pool of entity. The allocation of tokens to leadership may be recorded as a transaction in the blockchain. Accordingly, a macro-view of risk allocation may be accessed and viewed for an entity.

In some embodiments, a segment may be associated with a segment manager operative to manage the tokens and/or risk decisions for the segment. In some embodiments, segment manager may be an officer, manager, supervisor, employee, or other associate of entity tasked with managing the risk of segment. In various embodiments, segment manager may be a software tool operative to manage risk for segment, for example, based on segment policies, smart contracts, and/or the like. For example, a segment manager may access risk management software via risk exchange platform 184 of client computing device 160a-n to perform risk management functions for a segment (for instance, an IT department, a human resources (HR) department, a purchasing department, and/or the like). In various embodiments, tokens allocated to a segment may be provided to a segment manager wallet for further allocation within segment.

At block 506, logic flow 500 may allocate tokens to sub-segments. For example, tokens may be allocated to individual segment, sub-segment, group, and/or the like wallets for distribution. In some embodiments, the risk exchange may include buy/sell wallets, for example, each corresponding to a wallet associated with a segment, segment manager, and/or the like. This allocation step may be recorded as a transaction in the blockchain. Logic flow 500 may determine segment risk decisions at block 508. For example, risk decisions and day-to-day transactions may be recorded between segment wallets, manager wallets, and buy/sell associated with the risk exchange. In this manner, a micro-view of day-to-day risk decisions and quantified risk exposure may be accessible via the risk exchange.

Figure 6:
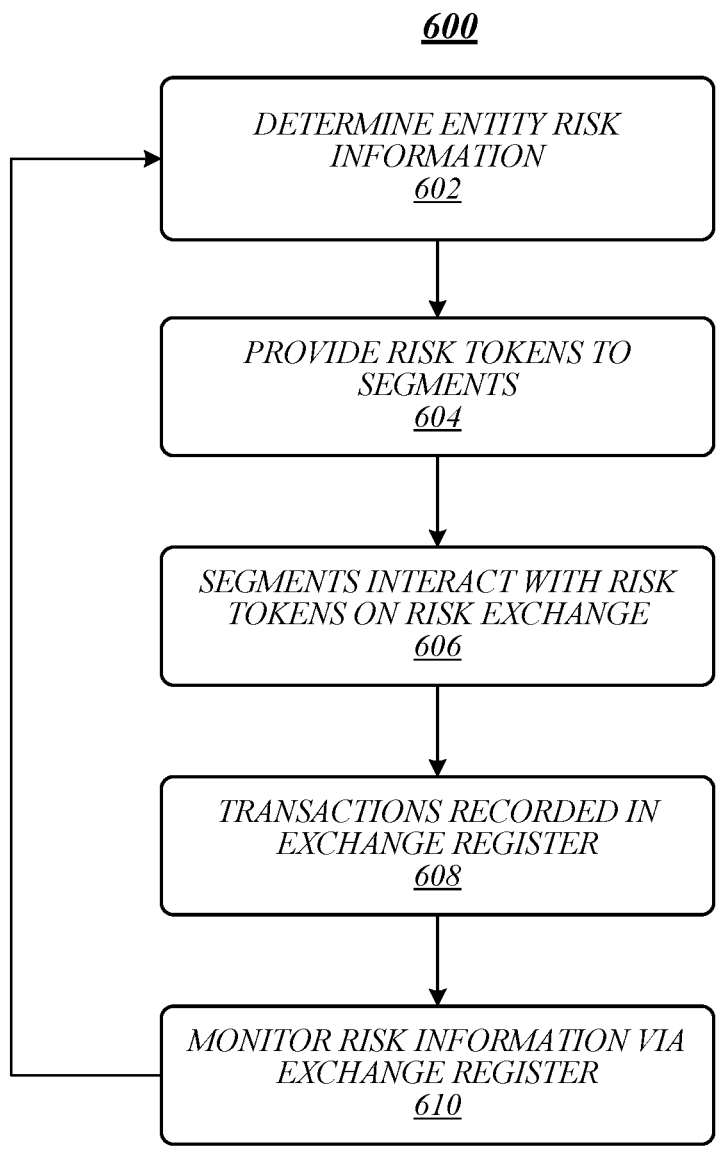
FIG. 6 illustrates an embodiment of a second logic flow.

FIG. 6 illustrates an embodiment of a logic flow 600. Logic flow 600 may be representative of some or all of the operations executed by one or more embodiments described herein, such as computing device 110 and/or risk exchange 450. In some embodiments, logic flow 600 may be representative of some or all of the operations of a risk exchange process according to some embodiments.

At block 602, logic flow 600 may determine entity risk information. For example, an officer of an entity (for instance, a chief risk officer (CRO)) may determine or update a risk appetite for an entity, such as a financial services company. The risk appetite may be quantified or enumerated in the form of a pool of risk tokens. In some embodiments, the risk tokens may be implemented via a blockchain or blockchain-related platform. A non-limiting example of such a blockchain platform may include Ethereum. Embodiments are not limited in this context. In some embodiments, the entity risk may change based on various conditions, such as market forces, changes in risk appetite, and/or the like.

At block 604, logic flow 600 may provide risk tokens to segments. In some embodiments, an entity associated with a risk exchange process may include a plurality of segments, such as departments, divisions, products, managers, and/or the like. The pool of risk tokens may be distributed to each segment (for example, to token wallets associated with each segment in a blockchain implementation). For example, for a financial services entity having three segments (an IT segment, a finance segment, and a software development segment), the IT segment may receive 10% of the risk tokens, the finance segment may receive 40% of the risk tokens, and the software development segment may receive 20% of the tokens. The remaining tokens may be undistributed and maintained in a reserve. In various embodiments, the distribution of tokens among segments (and among sub-segments) may be based on various exchange factors, such as risk appetite, segment performance, and/or the like.

Logic flow 600 may facilitate segments interacting with risk tokens on the risk exchange at block 606. For example, a segment may decide to accept or proceed with a risk event that has a risk transaction value (the cost of taking on the risk). In some embodiments, the decision to proceed with risk event may be encoded in a blockchain in the risk exchange for the token, for instance, a segment may be providing a token back into the entity pool of risk tokens in exchange for the risk. In a blockchain implementation, token exchanges may be facilitated by smart contracts. For example, a smart contract of the blockchain may include the conditions to allow the transaction to proceed, such as ensuring that the segment can be assigned the type of risk (for example, a real estate transaction department may not take on IT department risks, and vice versa), whether the segment has sufficient tokens, whether the segment will have a sufficient required balance post-transaction, whether the transaction requestor has sufficient authorization, and/or the like. If the smart contract conditions are met, the transaction of tokens for risk may be processed by the risk exchange.

At block 608, logic flow 600 may record transactions in an exchange register. For example, the risk exchange may be implemented via blockchain. Each transaction of tokens via the risk exchange may be recorded as a transaction in a block of blockchain. In some embodiments, accordingly, risk decisions may be tracked and logged on a perpetual blockchain solution based on a proof-of-trust model which would provide a clear audit trail of both macro and micro risk decisions for an entity. For example, a proof-of-trust (or PoT) protocol may be added to smart contracts used to implement the blockchain of a risk exchange (for example, a Proof of Trust (formerly iCash) PoT or similar protocol). Execution of a smart contract to facilitate a transaction, for example, may require that certain delegated participants validate the data before execution of the smart contract (for instance, implementing the exchange of tokens and risk on the risk exchange).

Figure 7:
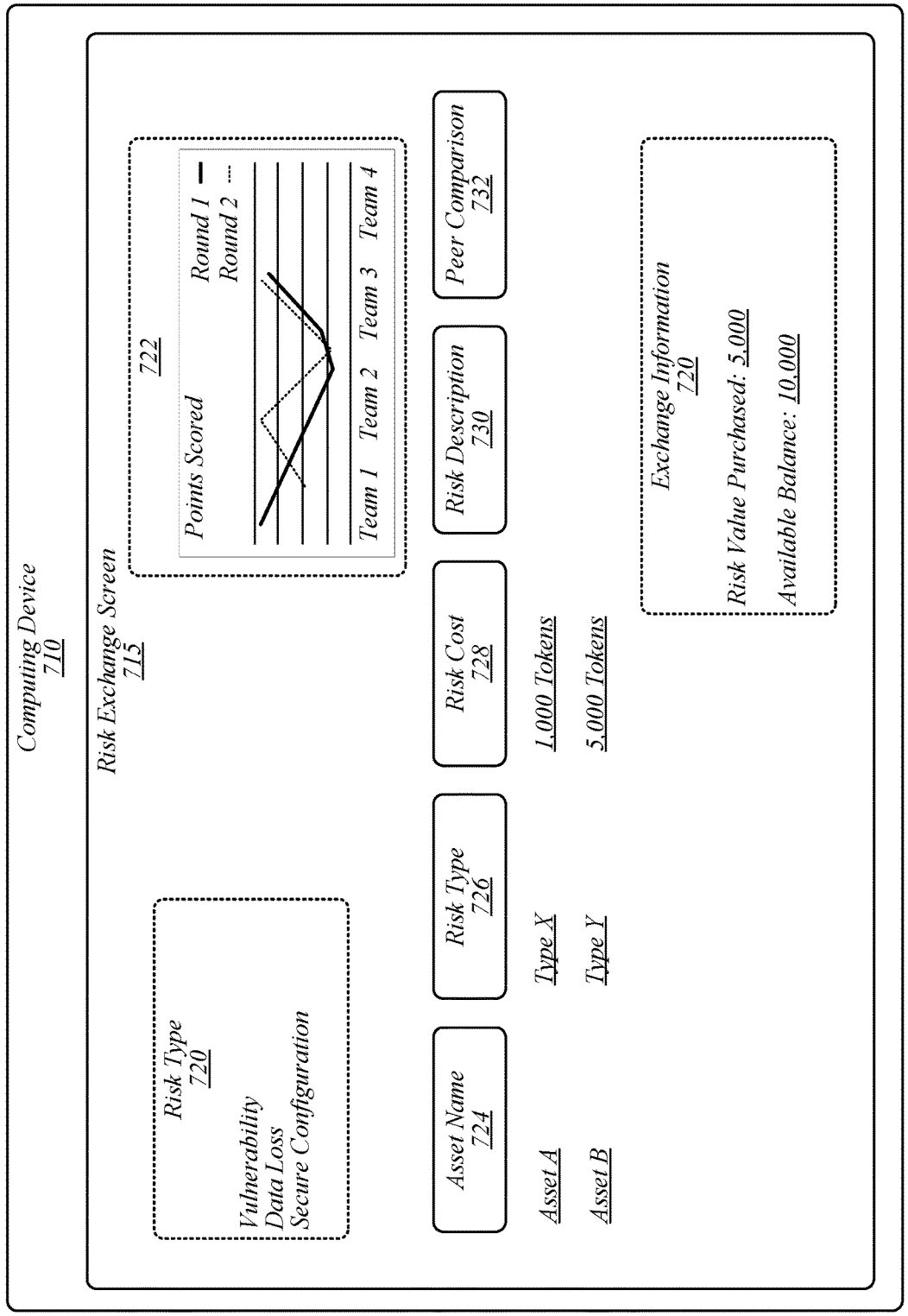
FIG. 7 illustrates an exemplary token-based risk exchange graphical user interface (GUI) display according to an embodiment.

Logic flow 600 may monitor risk information via the exchange register at block 610. For example, risk exchange application 136 may monitor and track transactions on the risk exchange for various properties, conditions, trends, and/or the like. In some embodiments, risk exchange application 136 and/or risk exchange application 184 may provide an interface for viewing and/or interacting with risk information. For example, FIG. 7 illustrates an embodiment of an exemplary risk exchange screen or dashboard 715 displayed via a computing device 710. As shown in FIG. 7, risk exchange screen 715 may allow a user to view various types of information, such as exchange information based on a risk type 720 (for instance, to filter transactions based on a vulnerability risk type, a data loss risk type, a secure configuration risk type, and/or the like). Risk exchange screen 715 may provide various GUI objects depicting various forms of exchange information, such as trends 722, charts, risk scores, token allocation, and/or the like. In some embodiments, risk exchange screen 175 may display and/or provide tools to create/edit risk events (or risk assets) and associated information, such as an asset name 724, risk type 726, risk cost 728, risk description 730, and/or peer comparison 732 (for example, a relative strength index comparison of peer segments, managers, and/or the like). In various embodiments, risk exchange screen 715 may depict token information 720, for example, for a segment, such as risk values purchased, available balance, and/or the like. In some embodiments, via risk exchange screen 715, managers at each level can manage risk postures (for example, is a managed segment out of bounds on risk posture) and be notified in real-time that risk posture has changed, for example, due to market conditions.

Figure 8:
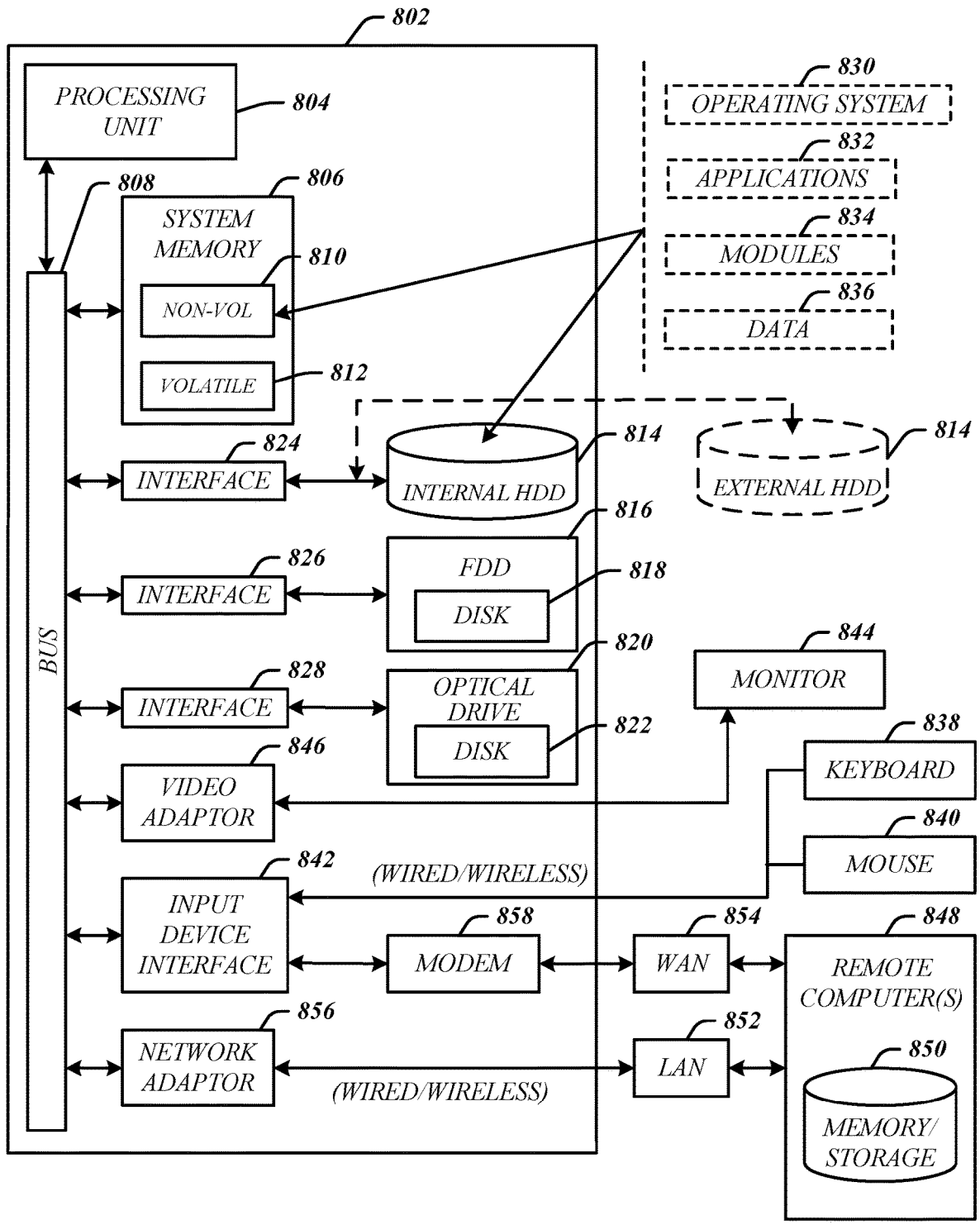
FIG. 8 illustrates an embodiment of a computing architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of computing devices 110 and/or 160*a-n*. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of computing device 110.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808 but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854 or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The following provide non-limiting example embodiments:

Example 1 may include an apparatus, comprising a storage device, and logic, at least a portion of the logic implemented in circuitry coupled to the storage device, the logic to implement an entity risk exchange to determine a total entity risk value representing a risk position of an entity comprising at least one segment, generate a plurality of risk tokens, each of the plurality of risk tokens having a token value that is a portion of the total risk value, determine a total segment risk value for the at least one segment, the total segment risk value representing a portion of the total entity risk value allocated to the at least one segment, and distribute the plurality of risk tokens to the at least one segment of the entity to correspond with the total segment risk value.

Example 2 may include the apparatus of Example 1, the logic to determine at least one risk transaction value associated with at least one risk event.

Example 3 may include the apparatus of Example 2, the logic to receive risk information comprising at least one of market conditions, updated entity risk posture, or market forecasts, and update the at least one risk transaction value based on the risk information.

Example 4 may include the apparatus of Example 2, the logic to receive a request from the at least one segment to use the plurality of tokens to purchase the at least one risk event.

Example 5 may include the apparatus of Example 2, the logic to perform a risk transaction via exchanging a portion of the plurality of tokens of the at least one segment for assignment of the at least one risk event to the at least one segment.

Example 6 may include the apparatus of Example 5, the logic to record the risk transaction in an immutable log.

Example 7 may include the apparatus of Example 6, the immutable log comprising a blockchain based on a proof of trust model.

Example 8 may include the apparatus of Example 1, each of the plurality of risk tokens comprising a cryptocurrency token implemented via a blockchain.

Example 9 may include the apparatus of Example 8, the plurality of risk tokens generated via a genesis block of the blockchain.

Example 10 may include a computer-implemented method to implement an entity risk exchange, the method comprising determining a total entity risk value representing a risk position of an entity comprising at least one segment, generating a plurality of risk tokens, each of the plurality of risk tokens having a token value that is a portion of the total risk value, determining a total segment risk value for the at least one segment, the total segment risk value representing a portion of the total entity risk value allocated to the at least one segment, and distributing the plurality of risk tokens to the at least one segment of the entity to correspond with the total segment risk value.

Example 11 may include the method of Example 10, comprising determining at least one risk transaction value associated with at least one risk event.

Example 12 may include the method of Example 11, comprising receiving risk information comprising at least one of market conditions, updated entity risk posture, or market forecasts, and updating the at least one risk transaction value based on the risk information.

Example 13 may include the method of Example 11, comprising receiving a request from the at least one segment to use the plurality of tokens to purchase the at least one risk event.

Example 14 may include the method of Example 11, comprising performing a risk transaction via exchanging a portion of the plurality of tokens of the at least one segment for assignment of the at least one risk event to the at least one segment.

Example 15 may include the method of Example 14, comprising recording the risk transaction in an immutable log.

Example 16 may include the method of Example 15, the immutable log comprising a blockchain based on a proof of trust model.

Example 17 may include the method of Example 10, each of the plurality of risk tokens comprising a cryptocurrency token implemented via a blockchain.

Example 18 may include the method of Example 17, the plurality of risk tokens generated via a genesis block of the blockchain.

Example 19 may include a non-transitory computer-readable medium storing instructions that, when executed, cause one or more processors to implement an entity risk exchange to determine a total entity risk value representing a risk position of an entity comprising at least one segment, generate a plurality of risk tokens, each of the plurality of risk tokens having a token value that is a portion of the total risk value, determine a total segment risk value for the at least one segment, the total segment risk value representing a portion of the total entity risk value allocated to the at least one segment, and distribute the plurality of risk tokens to the at least one segment of the entity to correspond with the total segment risk value.

Example 20 may include the non-transitory computer-readable medium of Example 19, the instructions, when executed, to cause the one or more processors to implement the entity risk exchange to determine at least one risk transaction value associated with at least one risk event, receive a request from the at least one segment to use the plurality of tokens to purchase the at least one risk event, perform a risk transaction via exchanging a portion of the plurality of tokens of the at least one segment for assignment of the at least one risk event to the at least one segment, and recording the risk transaction in an immutable log, wherein the immutable log comprises a blockchain based on a proof of trust model, wherein each of the plurality of risk tokens comprises a cryptocurrency token implemented via a blockchain.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   a storage device; and
   logic, at least a portion of the logic implemented in circuitry coupled to the storage device, the logic to implement an entity risk exchange to:
      determine a total entity risk value representing a risk position of an entity comprising at least one segment having a plurality of sub-segments, the entity comprising a business organization and the at least one segment comprising a department of the business organization,
      generate an immutable ledger using blockchain to record risk transactions of the entity,
      tokenize the total entity risk value via generating a plurality of risk tokens as a plurality of cryptocurrency tokens at a genesis block of the blockchain, each of the plurality of risk tokens having a token value that is a portion of the total risk value,
generate a plurality of cryptocurrency wallets for managing the plurality of risk tokens via the blockchain, the plurality of cryptocurrency wallets comprising a genesis wallet for storing the plurality of risk tokens generated at the genesis block, at least one manager wallet associated with the at least one segment, and a plurality of buy and sell wallets for each of the plurality of sub-segments,
determine a total segment risk value for the at least one segment, the total segment risk value representing a portion of the total entity risk value allocated to the at least one segment,
perform an allocation of the plurality of risk tokens to the at least one manager wallet to correspond with the total segment risk value for the at least one segment, the at least one manager wallet controlled by at least one segment manager,
record the allocation of the plurality of risk tokens to the at least one manager wallet in the blockchain,
perform an allocation of the plurality of risk tokens from the at least one manager wallet to the plurality of buy and sell wallets, each of the plurality of buy and sell wallets controlled by one of the plurality of sub-segments,
record each allocation of the plurality of risk tokens to each of the plurality of buy and sell wallets in the blockchain,
perform a risk transaction for the at least one of the plurality of sub-segments via exchanging a portion of the plurality of tokens from a buy and sell wallet of the at least one of the plurality of sub-segments for assignment of at least one risk event to the at least one at least one of the plurality of sub-segments, the at least one risk event comprising at least one of a function of the at least one segment or a business decision of the at least one segment, and
record the risk transaction in the blockchain.

2. The apparatus of claim 1, the logic to determine at least one risk transaction value associated with the at least one risk event.

3. The apparatus of claim 2, the logic to:
receive risk information comprising at least one of market conditions, updated entity risk posture, or market forecasts, and
update the at least one risk transaction value based on the risk information.

4. The apparatus of claim 3, the logic to:
present a risk exchange interface on at least one computing device in communication with the apparatus, the risk exchange interface to facilitate monitoring of transactions on the entity risk exchange, and
generate a notification indicating a change in a risk posture for the at least one segment responsive to a change in the risk information.

5. The apparatus of claim 2, the logic to receive a request from the at least one of the plurality of sub-segments to use the plurality of tokens to purchase the at least one risk event.

6. The apparatus of claim 1, the blockchain based on a proof of trust model.

7. The apparatus of claim 1, the logic to provide an amount of risk tokens to the at least one entity responsive to determining that the at least one entity has alleviated a risk event, the amount equal to a transaction value associated with the risk event.

8. The apparatus of claim 1, the plurality of sub-segments comprising at least one of a project, a product, a service, or a transaction of the at least one segment.

9. A computer-implemented method to implement an entity risk exchange, the method comprising:
determining a total entity risk value representing a risk position of an entity comprising at least one segment having a plurality of sub-segments, the entity comprising a business organization and the at least one segment comprising a department of the business organization;
generating an immutable ledger using blockchain to record risk transactions of the entity;
tokenizing the total entity risk value via generating a plurality of risk tokens as a plurality of cryptocurrency tokens at a genesis block of the blockchain, each of the plurality of risk tokens having a token value that is a portion of the total risk value;
generating a plurality of cryptocurrency wallets for managing the plurality of risk tokens via the blockchain, the plurality of cryptocurrency wallets comprising a genesis wallet for storing the plurality of risk tokens generated at the genesis block, at least one manager wallet associated with the at least one segment, and a plurality of buy and sell wallets for each of the plurality of sub-segments;
determining a total segment risk value for the at least one segment, the total segment risk value representing a portion of the total entity risk value allocated to the at least one segment;
performing an allocation of the plurality of risk tokens to the at least one manager wallet to correspond with the total segment risk value for the at least one segment, the at least one manager wallet controlled by at least one segment manager,
recording the allocation of the plurality of risk tokens to the at least one manager wallet in the blockchain;
performing an allocation of the plurality of risk tokens from the at least one manager wallet to the plurality of buy and sell wallets, each of the plurality of buy and sell wallets controlled by one of the plurality of sub-segments;
recording each allocation of the plurality of risk tokens to each of the plurality of buy and sell wallets in the blockchain;
performing a risk transaction for the at least one of the plurality of sub-segments via exchanging a portion of the plurality of tokens from a buy and sell wallet of the at least one of the plurality of sub-segments for assignment of at least one risk event to the at least one at least one of the plurality of sub-segments, the at least one risk event comprising at least one of a function of the at least one segment or a business decision of the at least one segment; and
recording the risk transaction in the blockchain.

10. The method of claim 9, comprising determining at least one risk transaction value associated with the at least one risk event.

11. The method of claim 10, comprising:
receiving risk information comprising at least one of market conditions, updated entity risk posture, or market forecasts, and
updating the at least one risk transaction value based on the risk information.

12. The method of claim 11, comprising:
present a risk exchange interface on at least one computing device, the risk exchange interface to facilitate monitoring of risk transactions on the entity risk exchange, and
generate a notification indicating a change in a risk posture for the at least one segment responsive to a change in the risk information.

13. The method of claim 10, comprising receiving a request from the at least one of the plurality of sub-segments to use the plurality of tokens to purchase the at least one risk event.

14. The method of claim 9, the blockchain based on a proof of trust model.

15. The method of claim 9, comprising providing an amount of risk tokens to the at least one entity responsive to determining that the at least one entity has alleviated a risk event, the amount equal to a transaction value associated with the risk event.

16. The method of claim 9, the plurality of sub-segments comprising at least one of a project, a product, a service, or a transaction of the at least one segment.

17. A non-transitory computer-readable medium storing instructions that, when executed, cause one or more processors to implement an entity risk exchange to:
determine a total entity risk value representing a risk position of an entity comprising at least one segment having a plurality of sub-segments, the entity comprising a business organization and the at least one segment comprising a department of the business organization,
generate an immutable ledger using blockchain to record risk transactions of the entity,
tokenize the total entity risk value via generating a plurality of risk tokens as a plurality of cryptocurrency tokens at a genesis block of the blockchain, each of the plurality of risk tokens having a token value that is a portion of the total risk value,
generate a plurality of cryptocurrency wallets for managing the plurality of risk tokens via the blockchain, the plurality of cryptocurrency wallets comprising a genesis wallet for storing the plurality of risk tokens generated at the genesis block, at least one manager wallet associated with the at least one segment, and a plurality of buy and sell wallets for each of the plurality of sub-segments,
determine a total segment risk value for the at least one segment, the total segment risk value representing a portion of the total entity risk value allocated to the at least one segment,
perform an allocation of the plurality of risk tokens to the at least one manager wallet to correspond with the total segment risk value for the at least one segment, the at least one manager wallet controlled by at least one segment manager,
record the allocation of the plurality of risk tokens to the at least one manager wallet in the blockchain,
perform an allocation of the plurality of risk tokens from the at least one manager wallet to the plurality of buy and sell wallets, each of the plurality of buy and sell wallets controlled by one of the plurality of sub-segments,
record each allocation of the plurality of risk tokens to each of the plurality of buy and sell wallets in the blockchain,
perform a risk transaction for the at least one of the plurality of sub-segments via exchanging a portion of the plurality of tokens from a buy and sell wallet of the at least one of the plurality of sub-segments for assignment of at least one risk event to the at least one at least one of the plurality of sub-segments, the at least one risk event comprising at least one of a function of the at least one segment or a business decision of the at least one segment, and
record the risk transaction in the blockchain.

18. The non-transitory computer-readable medium of claim 17, the instructions, when executed, to cause the one or more processors to implement the entity risk exchange to:
determine at least one risk transaction value associated with the at least one risk event; and
receive a request from the at least one of the plurality of sub-segments to use the plurality of tokens to purchase the at least one risk event;
wherein the blockchain is based on a proof of trust model.

19. The non-transitory computer-readable medium of claim 17, the plurality of sub-segments comprising at least one of a project, a product, a service, or a transaction of the at least one segment.

* * * * *